Figure 1:
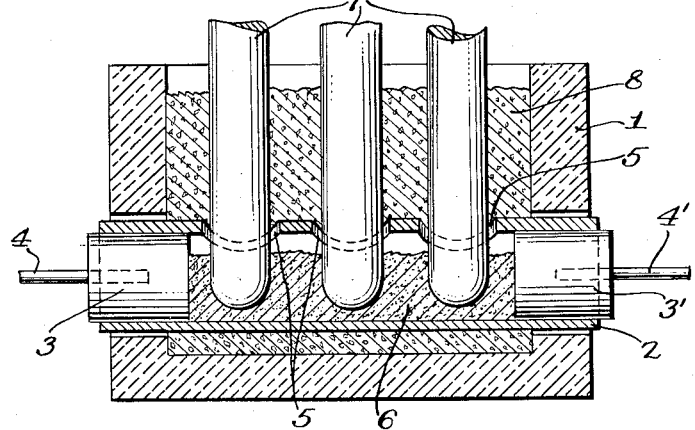

Nov. 29, 1955    F. J. MANN    2,725,032
APPARATUS FOR SILICONIZING SILICON CARBIDE BODIES
Filed Sept. 17, 1952

INVENTOR
FRANZ JOSEPH MANN.

BY

ATTORNEY

United States Patent Office 2,725,032
Patented Nov. 29, 1955

2,725,032

APPARATUS FOR SILICONIZING SILICON CARBIDE BODIES

Franz Josef Mann, Erlangen, Germany, assignor to Siemens-Planiawerke Aktiengesellschaft fuer Kohlefabrikate, Meitingen, near Augsburg, Germany, a corporation of Germany Application September 17, 1952, Serial No. 310,030

Claims priority, application Germany December 21, 1951

3 Claims. (Cl. 118—51)

This invention is concerned with a method of and apparatus for siliconizing silicon carbide bodies, especially the contact-forming ends of resistance heating rods, so as to provide such ends with a coating or impregnation of metallic silicon for the purpose of improving the contact properties thereof.

Known methods for impregnating silicon carbide heating rods with metallic silicon require immersion of preheated rods in a silicon melt. The resulting silicon coating is anchored in the pores of the corresponding silicon carbide rods, but does not penetrate the interior thereof to any appreciable depth.

It is an object of the invention to avoid the previously necessary preheating of the bodies prior to the impregnation thereof and to provide a procedure by which the silicon carbide crystals in the part of a body that is to be impregnated are completely embedded in the metallic silicon forming a dense structure therewith. The impregnation is in this manner more effective, and the procedure is more economical.

This object is realized by embedding in a bed of silicon powder contained in a melting chamber the parts or portions of formed porous silicon carbide bodies which are to be siliconized, and thereupon heating these parts or portions and the silicon powder to the melting temperature of the silicon, the interior of the melting chamber being, in the fluid condition of the silicon, under a gas or vapor pressure which exceeds the pressure of the gas or air mixture in the pores of the silicon carbide bodies.

The surcharge pressure in the melting chamber is, in accordance with another feature and object, produced by the vapor pressure of the molten silicon and is retained in the melting chamber by the provision of a protective layer or packing of quartz and coke powder, which separates the melting chamber from the outside and also serves for thermal and oxidation protection. The silicon carbide bodies which are to be processed extend in part through the protective layer with their ends disposed in the melting chamber. Gases occluded in the pores of the bodies can thus, during the heating, freely escape through the parts thereof which project from the protective layer to the outside.

The apparatus for carrying out the method comprises a tubular carbon member having its opposite ends closed by carbon plugs. The carbon plugs form terminals for connecting current to the tubular member which operates as a heating resistance. The tubular member is disposed in horizontal position in a suitable furnace casing. One or more holes are provided in the wall of such member for introducing thereinto the silicon powder and the ends of the bodies which are to be siliconized. The cross-sectional area of the wall of the tubular heating chamber is small as compared with the cross-sectional area of the carbon plugs at its opposite ends, and the heat produced by the current flow through the tubular member will therefore affect mainly the tubular portion thereof which extends between the carbon plugs.

An embodiment of the invention will now be described with reference to the accompanying drawings, wherein—

Figure 2:
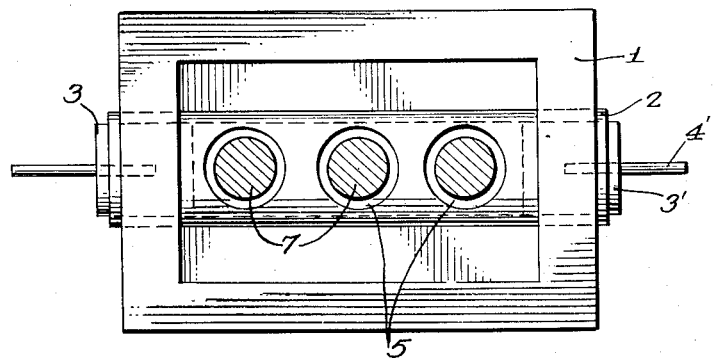

Fig. 1 is a cross-sectional view of an apparatus for carrying out the invention, with bodies to be siliconized inserted therein; and Fig. 2 shows an elevational top view of the apparatus.

Numeral 1 indicates a boxlike housing or casing made of suitable furnace material. In this casing or furnace is disposed the melting chamber comprising a tubular carbon member 2 which extends horizontally, as shown. The opposite ends of this tubular member 2 are closed by means of the carbon plugs 3 and 3', respectively. The latter are provided with current supply terminals, as indicated at 4 and 4'. Current may be supplied from a suitable source (not shown), and suitable switching means may be provided, as may be desired or necessary. Holes 5 are formed in the wall 2 of the tubular melting chamber. The silicon carbide bodies 7, which are to be siliconized, are introduced into the melting chamber out of contact with the wall thereof, after inserting thereinto the silicon powder indicated at 6. The silicon powder inserted fills the melting chamber only partially, as indicated in Fig. 1. A layer or packing 8 of quartz and coke particles is disposed around the melting chamber, enveloping it as shown and partially also enveloping the bodies 7 which project therefrom freely to the outside. The layer or packing 8 isolates or separates the melting chamber with respect to the outside. The packing 8 also serves as a thermal and as an oxidation protection for the melting chamber 2 as well as for the silicon powder 6 in the melting chamber.

When current is connected to the terminals 4 and 4', it will flow through the walls of the tubular melting chamber, causing heating thereof and thereby melting the silicon powder 6 and at the same time also heating the ends of the body 7, which are to be siliconized, thus in the course of heating degassing these bodies. The vapor pressure of the melting silicon produces in the melting chamber a surcharge pressure, because the silicon vapors cannot escape through the packing 8. The surcharge pressure in the melting chamber drives the silicon, upon melting thereof, into the degassed pores of the silicon carbide bodies 7. The parts or portions of these bodies, which are to be siliconized, are at a temperature which corresponds to that of the molten silicon, and the impregnation of the silicon carbide bodies 7 with the metallic silicon therefore is very thorough and complete. The silicon carbide crystals are in this manner enveloped by and embedded in the metallic silicon.

The high temperature incident to this impregnating action appears to play a particular role and probably conditions the silicon carbide crystals so as to promote the union with the metallic silicon. Such action is believed to account for the extraordinary structural density of the finished product. It is also possible that surface forces become effective in the fine pores of the silicon carbide bodies, which play an important role in the impregnation. This may be an explanation for the fact that the bodies resulting from the treatment according to the invention form the typical structure of an alloy in which silicon carbide and silicon are evenly distributed, while it is impossible to reach a point in the heating of a mixture of silicon carbide powder and metallic silicon to the melting temperature of the silicon at which the silicon forms an alloy with the silicon carbide. In the latter procedure only clumps of molten silicon are formed, to which a few silicon carbide particles adhere, but there is no fusion and binding of silicon carbide in the silicon.

I claim:

1. Apparatus for siliconizing predetermined portion of porous silicon carbide bodies comprising a tubular horizontally disposed carbon member forming a melting chamber into which is introduced silicon powder, closures carried by the ends of said tubular member in fluid tight relationship, means forming a housing around said chamber, holes being formed in said tubular carbon member to project therethrough said silicon carbide bodies so as to dispose the portions thereof which are to be siliconized in said melting chamber and to embed such portions in the silicon powder therein, a protective packing disposed around said melting chamber and around parts of said bodies, the remaining parts of said bodies projecting from said protective packing to the outside, means including electrical terminals connected at the ends of said tubular member for gradually heating said melting chamber to melt said silicon powder therein, said embedded portions of said bodies being correspondingly gradually heated, first to elevated temperature to cause escape of gaseous matter occluded therein to the outside through the parts of said bodies which project from said packing and thereafter to assume a temperature corresponding to the melting temperature of said silicon in said melting chamber, said protective packing preventing dissipation of the vapor pressure generated in said melting chamber by the melting of said silicon to cause the molten silicon to penetrate into the degassed pores of the embedded portions of said silicon carbide bodies.

2. The apparatus as defined in claim 1, wherein said packing comprises quartz and coke particles.

3. The apparatus as defined in claim 1 wherein said closures are carbon plugs and said terminals are connected to said plugs.

References Cited in the file of this patent

UNITED STATES PATENTS

| | | |
|---|---|---|
| 587,138 | Roberts | July 27, 1897 |
| 826,745 | Price | July 24, 1906 |
| 1,100,709 | Brown | June 23, 1914 |
| 1,901,525 | Moschel | Mar. 14, 1933 |
| 1,906,963 | Heyroth | May 2, 1933 |
| 2,027,786 | Ridgway et al. | Jan. 14, 1936 |
| 2,536,774 | Samuel | Jan. 2, 1951 |